United States Patent [19]

Lee et al.

[11] Patent Number: 5,646,205

[45] Date of Patent: Jul. 8, 1997

[54] ION COMPLEX MEMBRANE AND A METHOD FOR PRODUCING SAME

[75] Inventors: Kew Ho Lee; Jung Hoon Kim; Jong Geon Jegal, all of Daejeon, Rep. of Korea

[73] Assignee: Korea Research Institute of Chemical Technology, Daejeon, Rep. of Korea

[21] Appl. No.: 490,124

[22] Filed: Jun. 14, 1995

[30] Foreign Application Priority Data

Oct. 5, 1994 [KR] Rep. of Korea ............... 1994-25651

[51] Int. Cl.$^6$ ............... C08L 5/00; B01D 53/22; B01D 15/04
[52] U.S. Cl. ............... 524/27; 95/52; 210/638; 210/640; 210/644; 210/654; 424/484; 424/485; 424/487; 424/488; 428/36.3; 428/36.9; 524/29; 524/30; 524/55; 528/391; 536/18.1; 536/20; 536/54; 536/55
[58] Field of Search ............... 95/52; 210/638, 210/640, 644, 654; 424/484, 485, 486, 487, 488; 428/363, 369; 524/27, 29, 30, 55; 528/391; 536/18.1, 20, 51, 53, 54, 55

[56] References Cited

U.S. PATENT DOCUMENTS 4,301,067 11/1981 Koshugi ............................... 536/20
4,871,461 10/1989 Karakane et al. ............... 210/638

OTHER PUBLICATIONS

Huang, R.Y.M. et al. "Pervaporation Separation ... " Journal of Membrane Science, 51 (1990) 273–292.
Watson, J.M. et al. "A Study of Organic Compound ... " Journal of Membrane Science, 49 (1990) 171–205.
Zhao, X.P. et al. "Pervaporation Separation ... " Journal of Applied Polymer, vol. 41, 2133–2145. (1990).

Mochizuki, A. et al. "Pervaporation Separation ... " Jurnal of Applied Polymer Science, vol. 40. 633–643 (1990).

Mochizuki, A. et al. "Pervaporation Separation ... " Journal of Applied Polymer Science, vol. 37, 3385–3398 (1989).

Karakane, H. et al. "Separation of Water ... " Journal of Applied Polymer Science, vol. 42. 3229–3239. (1991).

*Primary Examiner*—Shelley A. Dodson
*Attorney, Agent, or Firm*—Ladas & Parry

[57] ABSTRACT

An ionomer for an ion complex membrane useful for the separation of water-organic solvent by osmosis or low pressure osmosis as well as by pervaporation and a method for producing ion complex membrane therefrom are disclosed. The ionomer for producing ion complex membrane can be prepared by heat polymerization of an alkyl compound having pyridyl groups such as 1,3-di(4-pyridyl) propane at both terminal ends with a dihaloalkane compound such as dibromooctane and dichloroheptane having two halogen atoms at both terminal ends or with one or two halogen atoms affixed to intermediate carbon atoms in a polar solvent such as acrylonitrile. An ion complex membrane can be produced by preparing a membrane of a polycation or polyanion in a solution casting method and dipping the membrane in a solution of polycation or polyanion for 24 hours to give an ion complex membrane. This ion complex membrane may be a single membrane or composite membrane. Composite membrane includes a plain membrane and a hollow fiber membrane. The ion complex membrane according to the present invention is useful for the separation of water-organic solvents.

17 Claims, No Drawings

ION COMPLEX MEMBRANE AND A METHOD FOR PRODUCING SAME

FIELD OF THE INVENTION

The present invention relates to an ion complex membrane, and a method for producing same. More specifically, it relates to an ion complex polymer membrane for separation formed by binding of cationic polymer with anionic polymer, and a method for producing same.

BACKGROUND OF THE INVENTION

Generally, separation of a water-organic solvent has been performed by pervaporation, and much reserches has been devoted to the method. Separation of water-organic solvent can also be carried out by other than pervaporation, for example, by reverse osmosis or low pressure reverse osmosis. Several studies on this matter have been carried out.

Component materials of membranes for the separation of water-organic solvent which have been developed until now can be largely be divided into two types: Hydrophilic materials such as polyvinyl alcohol (J. of Memb. Sci, 51(1990) 273–292, J. Memb. Sci., 51 (1990) 215–226), polyacrylic acid (J. Appl. Polym. Sci., 41 (1990) 2133–2145) and cellulose (J. Appl. Polym. Sci., 40 (1990) 633–643, J. Appl. Polym. Sci., 37 (1989) 3385–3398), and hydrophobic materials such as polysiloxane (J. of Memb. Sci., 49(1990) 171–205). Hydrophilic materials are useful for purifying organic solvent, and therefore have been widely used for the production of membrane which can be used to separate and remove minor amount of water in alcohols. The development of the membrane for the separation of water-alcohol using the above mentioned materials has made much progress up to now.

Hydrophobic materials, contrary to the hydrophilic materials can be used for the production of separation membrane to separate and remove minor amount of organic solvent in water, i.e. alcohols or chloro compounds in water. Much research in this field is also being actively carried out.

In the case of removing minor amount of water in organic solvent, the membrane used for this purpose should have good hydrophilicity. This is because if the hydrophilicity is good, water in organic solvent is selectively absorbed into membrane and then the absorbed water selectively pass through membrane, and thereby selectivity and permeability of membrane can be acquired to be a good membrane for separation. At present numerous types of polymers having good selectivity to water are known. However, among them, very few polymers can be used for the production of membrane for separation. Polymers which have been most frequently used are poly(vinyl alcohol), poly(acrylic acid) and cellulose type polymers. Those materials are polar polymers which reveal good affinity to water. For this reason, many studies of membrane using those materials have been carried out. However, when hydrophilicity of those materials is compared with that of ionomer in which ionic group is main chain or side chain of polymer, it is clear that ionomer has much higher hydrophilicity. Poly(vinyl alcohol), poly(acrylic acid) and cellulose type polymers have restricted affinity to water since they do not have ionic group.

In the case of separating water selectively from mixtures containing small amounts of water, hydrophilicity of membrane is the most crucial factor with respect to capacity of the membrane. In particular, hydrophilicity of the membrane is indispensable to the selectivity of the membrane.

To avoid the above mentioned problems, new materials in which an ionic group was introduced to main chain or side chain of the polymer appeared. Most of them are produced by treating poly(acrylic acid) with a base such as sodium hydroxide, and some are produced by treating cellulose with chloride. These materials have good affinity to water and therefore the membranes produced from these materials have fairly good quality.

However, these materials have deficiencies in that stability of the membrane is decreased since ionic groups in the materials may be neutralized by the action of acidic materials contained in the water or mixture. Hydrophilicity of the membrane decreases as ionic character of the membrane disappears. Decrease of selectivity of membrane also naturally ensues from the decrease of affinity to water. Therefore, the quality of the membrane decreases greatly as time passes although the membrane has excellent separation capability at first.

To overcome the above mentioned problems, Maeda et at. suggested an ion complex membrane made by using polyacrylic acid in Journal of Applied Polymer Science, Vol.42, 3229(1991). However, the production of ion complex membrane by using polyacrylic acid according to Maeda et al. is troublesome since polyacrylic acid have to be made in the anion state to be used in the production of an ion complex membrane. Therefore the ion complex membrane suggested by Maeda et al. still leaves much to be desired.

Given these considerations, it is clear that any ion complex separation membrane which would have good separation capability to separate minor amounts of water in an organic solvent and good stability would have significant advantages over the prior art membranes.

Based on the result of the above-mentioned studies, the present inventors have made extensive studies in order to develop a membrane for separation which is useful for water-organic solvent separation by pervaporation and as well as by other method, i.e. reverse osmosis or low pressure reverse osmosis. As a result, the present inventors have now found that by preparing cationic polymer, and then dipping the cationic polymer in an anionic polymer solution, an ion complex membrane can be produced. Based on these findings, we have completed the present invention.

SUMMARY OF THE INVENTION

It is therefore an object of the invention to provide a cationic polymer having repeating structure of the formula (I)

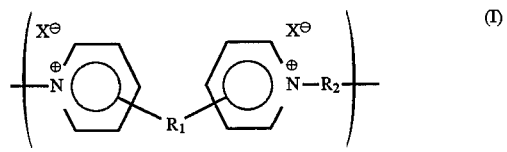

in which $R_1$ and $R_2$, independently of one another, are linear or branched $C_1$–$C_{10}$ alkylene, and bonded at ortho-, meta- or para-position, and X is Br, Cl, F,

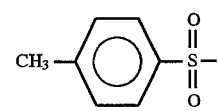

or

-continued

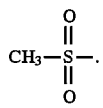

It is a further object of the present invention to provide a method for producing the cationic polymer of the formula(2) by reacting a compound of the formula(2) with a compound of the formula(3)

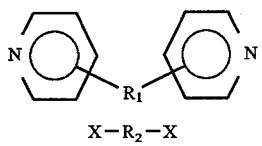

in which

R₁ and R₂, independently of one another, are linear or branched $C_1$–$C_{10}$ alkylene, and bonded at ortho-, meta- or para-position, and X is Br, Cl, F,

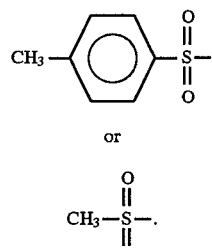

It is a further object of the present invention to provide a method for producing ion complex membrane which have excellent stability as well as improved separation property from new cationic polymer.

DETAILED DESCRIPTION OF THE INVENTION

The present invention relates to a polymer for producing an ion complex membrane, an ion complex membrane prepared therefrom and a method for producing said polymer or membrane.

A polymer for producing ion complex membrane can be produced by polymerization of compound of the formula(2) with compound of the formula(3 )

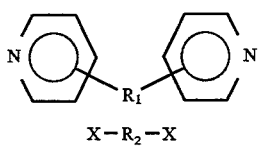

in which

R₁ and R₂, independently of one another, are linear or branched $C_1$–$C_{10}$ alkylene, and bonded at ortho-, meta- or para-position, and X is Br, Cl, F,

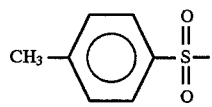

or

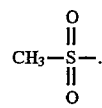

The polymerization reaction can be carried out in polar solvent, for example acrylonitrile solvent.

An ion complex polymer membrane according to the present invention can be produced either by preparing a conventional anionic polymer membrane and then dipping thus prepared membrane in the solution of the cationic polymer according to the present invention, or by preparing a cationic membrane according to the present invention and then dipping the obtained membrane in the solution of a conventional anionic polymer.

Membrane may be plain membrane or composite membrane. The method for producing plain membrane can employ general membrane producing methods. For example, single membrane may be produced by casting a solution on plate. A composite membrane may be produced either by polymer-foil formation method or by in-situ polymerization method. The polymer-foil formation method is performed by producing a polymer and then attaching the polymer to a support. The latter method includes the water-extended method, Langmuir-Blogett method, and solution coating method. The in-situ polymerization method is performed by forming a polymer-foil directly on a support. The in-situ method includes monomer-application/ polymerization (crosslinking), surface polymerization, condense polymerization, ultra-violet polymerization, and plasma polymerization methods. A support can be produced by known methods. One method for producing a support of composite membrane is as follows: Polysulfone or polyetherimide is dissolved in N-methylpyrrolidone (NMP), the resulting solution is casted onto non-woven fabric by a doctor knife, and then either by phase inversion of the cast material in distilled water to form porous support in a plain membrane state, or by wet-spinning the casted material to form porous support in a hollow fiber.

Examples of prior anionic polymers are cellulose type anionic polymers such as K-carrageenan, L-carrageenan, sodium alginate and chitosan salt. Solutions for producing ion complex are preferably aqueous solutions. The dipping period in solution is several hours to several days, preferably 6 hours to 48 hours.

Now, the present invention will be described more specifically by examples hereafter, but it should be noted that the present invention is not intended to be restricted within those specific examples.

EXAMPLE 1

6.95 g of 1,2-dibromoethane and 7.28 g of 1,3-di(4-pyridyl)propane were dissolved in 200 ml of acetonitrile. The resulting solution was reacted at 55° C. for 5 days with stirring. Polymers formed began to precipitate after 1 hour, and after the completion of the reaction, precipitated polymer was filtered and dried under vacuum. Polymer thus prepared was soluble in water and methanol, and showed excellent water absorption property.

EXAMPLE 2

The procedure of Example 1 was repeated except that 8 g of 1,4-dibromoethane was used in place of 6.95 g of 1,2-dibromoethane to give a polycation. The polymer thus prepared was soluble in water and methanol, and showed excellent water absorption property.

EXAMPLE 3

The procedure of Example 1 was repeated except that 9.03 g of 1,6-dibromohexane was used in place of 6.95 g of 1,2-dibromoethane to give a polycation. The polymer thus prepared was soluble in water and methanol, and showed excellent water absorption property.

EXAMPLE 4

The procedure of Example 1 was repeated except that 10.0 g of 1,8-dibromoochane was used in place of 6.95 g of 1,2-dibromoethane to give a polycation. The polymer thus prepared was soluble in water and methanol, and showed excellent water absorption property.

EXAMPLE 5

2 g of 1,8-bis(4-toluenesulfonyl)octane and 0.87 g of 1,3-di(4-pyridyl)propane were dissolved in 100 ml of acetonitrile. The resulting solution was reacted at 55° C. for 5 days with stirring. After the completion of the reaction, solvent was evaporated by a vacuum drier. The polymer thus prepared was soluble in water and methanol, and showed excellent water absorption property.

EXAMPLE 6

1% by weight of aqueous solution of K-carrageenan was cast onto an acryl plate and dried in air at room temperature to give K-carrageenan film. The film was cut in a size of 10 cm×10 cm and dipped in 2% by weight of aqueous solution of the polycation prepared in Example 1 for 24 hours to give an ion complex membrane. The membrane was in good condition. Water-ethanol mixture (90/10, by weight) was separated in a pervaporation method by using the prepared ion complex membrane. The result is listed in the following Table.

EXAMPLE 7

The procedure of Example 6 was repeated except that 2% by weight of the polycation prepared in Example 2 was used in place of the polycation prepared in Example 1 to give an ion complex membrane. The membrane prepared above was in good condition. Water-ethanol mixture (90/10, by weight) was separated in a pervaporation method by using the prepared ion complex membrane. The result is listed in the Table.

EXAMPLE 8

The procedure of Example 6 was repeated except that 2% by weight of the polycation prepared in Example 3 was used in place of the polycation prepared in Example 1 to give an ion complex membrane. The membrane prepared above was in good condition. Water-ethanol mixture (90/10, by weight) was separated in a pervaporation method by using the prepared ion complex membrane. The result is listed in the Table.

EXAMPLE 9

The procedure of Example 6 was repeated except that 2% by weight of the polycation prepared in Example 4 was used in place of the polycation prepared in Example 1 to give an ion complex membrane. The membrane prepared above was in good condition. Water-ethanol mixture (90/10, by weight) was separated in a pervaporation method by using the prepared ion complex membrane. The result is listed in the Table.

EXAMPLE 10

The procedure of Example 6 was repeated except that 2% by weight of the polycation prepared in Example 5 was used in place of the polycation prepared in Example 1 to give an ion complex membrane. The membrane prepared above was in good condition. Water-ethanol mixture (90/10, by weight) was separated in a pervaporation method by using the prepared ion complex membrane. The result is listed in the Table.

Comparative Example 1

Pervaporation property of a single plain membrane prepared by using poly(vinyl alcohol) as membrane component was measured in accordance with the general procedure described in Example 6. The result is listed in the Table.

Comparative Example 2

Pervaporation property of a single plain membrane prepared by using poly(acrylic acid) as membrane component was measured in accordance with the general procedure described in Example 6. The result was listed in the Table.

TABLE

| | Separation of water/ethanol mixture(10/90) according to permeation evaporation method | |
|---|---|---|
| | Selectivity | permeability(kg/m².h) |
| Example 6 | 15000 | 0.45 |
| 7 | 14500 | 0.43 |
| 8 | 14200 | 0.42 |
| 9 | 14000 | 0.42 |
| 10 | 14000 | 0.40 |
| Com. Example 1 | 4000 | 0.08 |
| 2 | 1000 | 0.07 |

As seen from the table, membranes according to the present invention have higher water-ethanol separation property than that of the membranes prepared from prior materials. This good separation property would be more obvious in organic material other than ethanol since ethanol is an organic material which is difficult to be separated from water. Therefore, it is understood that the ion complex membrane according to the present invention has excellent water-ethanol separation property.

What is claimed is:

1. A cationic polymer having repeating structure of the formula(I)

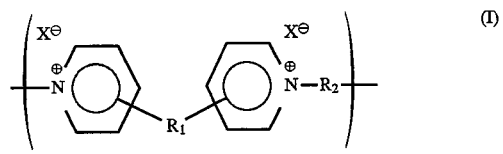

in which and $R_1$ and $R_2$, independently of one another, are linear or branched $C_1$–$C_{10}$ alkylene, and bonded at ortho-, meta- or para-position, and X is Br, Cl, F,

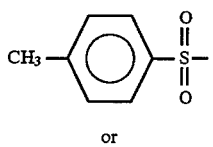

or

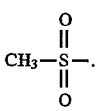

2. A method for producing an ion complex polymer membrane which comprises (i) preparing a membrane from a cationic polymer according to claim 1 or a cellulose type anionic polymer, and (ii) dipping the polymer membrane prepared in step (i) in a solution of a polymer having a counter ion property to the polymer used in step (i), said polymer having the counter ion property being a cationic polymer according to claim 1 or a cellulose type anionic polymer.

3. A method for producing an ion complex polymer membrane according to claim 2 wherein the membrane is a composite membrane.

4. A method for producing an ion complex polymer membrane according to claim 3 wherein the support of the composite membrane is a hollow tubular fiber.

5. A method for producing ion complex polymer membrane according to claim 2 wherein the anionic polymer is K-carrageenan, L-carrageenan, sodium alginate, poly (acrylic acid) salt and chitosan salt.

6. A method for producing an ion complex polymer membrane according to claim 2 wherein the polymer dipping solution in step ii) is an aqueous solution.

7. A method for preparing a polymer according to claim 1 which comprises heating in a solution a compound of the formula(2) with a compound of the formula (3)

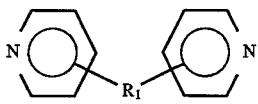 (2)

$$X-R_2-X \quad (3)$$

in which $R_1$ and $R_2$, independently of one another, are linear or branched $C_1$–$C_{10}$ alkylene, and bonded at ortho-, meta- or para-position, and X is Br, Cl, F,

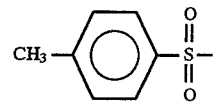

or

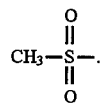

8. A method according to claim 7 wherein acetonitrile is used as a solvent.

9. A method according to claim 2, wherein the membrane is a plain membrane.

10. A method according to claim 2, wherein the membrane is formed from the cellulose type polymer and said membrane is dipped in a solution of the cationic polymer.

11. A method according to claim 2, wherein a membrane is prepared from the cationic polymer and said membrane is dipped in a solution of the cellulose type anionic polymer.

12. A method according to claim 2, wherein the cellulose type anionic polymer is K-carrageenan.

13. A method according to claim 10, wherein the cellulose type anionic polymer is K-carrageenan.

14. A method according to claim 11, wherein the cellulose type anionic polymer is K-carrageenan.

15. An ion complex membrane produced by the method according to claim 2.

16. An ion complex membrane produced by the method according to claim 10.

17. An ion complex membrane produced by the method according to claim 12.

* * * * *

UNITED STATES PATENT AND TRADEMARK OFFICE
CERTIFICATE OF CORRECTION

PATENT NO.   : 5,646,205
DATED        : July 8, 1997
INVENTOR(S)  : Kew-Ho LEE

It is certified that error appears in the above-indentified patent and that said Letters Patent is hereby corrected as shown below:

Column 4, line 44, insert --, such as an anionic polymer having a polysaccharide backbone, -- after "polymers".

Claim 2, line 3, change "cellulose type" to -- an --;
line 4, after "polymer" insert -- having a polysaccharide backbone --;
line 8, change " a cellulose type" to -- an --; and
line 9, after "polymer" insert -- having a polysaccharide backbone --.

Claim 5, lines 3 to 4, change ",poly(acrylic acid) salt and" to -- or a --.

Claim 11, line 3, Claim 12, lines 1 to 2, Claim 13, lines 1 to 2, and
Claim 14, lines 1 to 2, in each instance delete "cellullose type".

Signed and Sealed this

Seventeenth Day of February, 1998

Attest:

BRUCE LEHMAN

Attesting Officer    Commissioner of Patents and Trademarks